(12) United States Patent
Veikos

(10) Patent No.: US 9,955,106 B1
(45) Date of Patent: Apr. 24, 2018

(54) TELEVISION SUPPORT MOUNTING SYSTEM THAT ATTACHES TO A CLAMP AND EMPLOYS A TENSION POLE AS A BASE

(71) Applicant: Fotios Veikos, Montreal (CA)

(72) Inventor: Fotios Veikos, Montreal (CA)

( * ) Notice: Subject to any disclaimer, the term of this patent is extended or adjusted under 35 U.S.C. 154(b) by 0 days.

(21) Appl. No.: 15/298,695

(22) Filed: Oct. 20, 2016

(51) Int. Cl.
| | |
|---|---|
| *H04N 5/655* | (2006.01) |
| *F16M 13/02* | (2006.01) |
| *F16B 2/18* | (2006.01) |
| *F16B 2/06* | (2006.01) |
| *F16B 7/14* | (2006.01) |

(52) U.S. Cl.
CPC ............... *H04N 5/655* (2013.01); *F16B 2/06* (2013.01); *F16B 2/185* (2013.01); *F16B 7/14* (2013.01); *F16M 13/022* (2013.01)

(58) Field of Classification Search
CPC ... H04N 5/655; F16B 2/06; F16B 7/14; F16B 2/185; F16M 13/022
USPC .................................. 248/200.1, 201, 229.23
See application file for complete search history.

(56) References Cited

U.S. PATENT DOCUMENTS

| | | | | |
|---|---|---|---|---|
| 3,022,974 A | * | 2/1962 | Knodel ................ | A47B 57/545 248/200.1 |
| 5,897,085 A | * | 4/1999 | Cronin ............... | A47B 96/1425 248/200.1 |
| 6,138,970 A | * | 10/2000 | Sohrt ..................... | F16M 11/10 248/278.1 |
| 7,290,742 B2 | * | 11/2007 | Wang ..................... | A45B 7/005 135/16 |
| 8,052,110 B2 | * | 11/2011 | Wang ..................... | E04G 25/06 248/354.1 |
| 8,079,311 B2 | * | 12/2011 | Whalen .................. | F16M 11/00 108/42 |
| 2004/0079849 A1 | * | 4/2004 | Rudolf ................ | F16C 11/0619 248/276.1 |

* cited by examiner

*Primary Examiner* — Gwendolyn W Baxter
(74) *Attorney, Agent, or Firm* — Robic, LLP.

(57) ABSTRACT

A support system for supporting a television, said support system comprising a mounting bracket and at least one universal clamp. The mounting bracket is fixedly mountable to said universal clamp and comprises a mounting plate provided with a hole-pattern spaced for mounting to the universal clamp; and bracket arms adapted to be attachable to a back of the television. The support system further comprises at least one mounting structure defining a longitudinal axis, having a length adjustable along said longitudinal axis and is adapted to be tension mounted. The universal clamp is adapted to allow movement along and about the longitudinal axis of the at least one mounting structure and is fastenable thereto using a lever movement. The support system is adapted to prevent movement of the television relative to the at least one mounting structure when the universal clamp is fastened thereto.

11 Claims, 5 Drawing Sheets

TELEVISION SUPPORT MOUNTING SYSTEM THAT ATTACHES TO A CLAMP AND EMPLOYS A TENSION POLE AS A BASE

FIELD OF INVENTION

The invention is in the field of mounting systems for televisions, more specifically a mount that attaches to a clamp to be affixed onto a tension pole.

BACKGROUND OF INVENTION

Since the introduction of the flat panel television, consumers have been given the complex task of how to support their televisions; on a suitable stand or to a mount on a wall or on a large console.

It is often the case that apartment dwellers are not permitted to drill holes for mounts into their walls and most consumers generally lack the skill of this complex task.

Furthermore, as the cost of real estate rises square footage has decreased; most notable, for inner city living. "Bowling alley" floor plans, (i.e. long and narrow) are frequently configured to maximize the number of units built per floor. As a result, there has been a growing trend in space saving innovations.

There is even a recent trend to forgo the television altogether, as floor mounted options for displaying the television are way too bulky and take up too much space.

Prior mounting systems require a high degree of skill in mounting a television to the wall or other support options. In some instances no wall is available or suitable to the consumer for this option.

At the same time an advantage that we have seen in the television industry is the advance of the LCD and LED television. The weight of the standard television has dropped considerably (to less than 20 kg) and they have become much thinner.

SUMMARY OF THE INVENTION

According to an aspect, the invention relates to a support system for supporting a television, said support system comprising:
(a) a mounting bracket for securing a television thereon, and
(b) at least one universal clamp,
the mounting bracket being fixedly mountable to said at least one universal clamp and comprising:
  a mounting plate provided with a hole-pattern spaced for mounting to the at least one universal clamp; and
  bracket arms adapted to be attachable to a back of the television; and
(c) a mounting structure defining a longitudinal axis, having a length adjustable along said longitudinal axis and being adapted to be tension-mounted;
the at least one universal clamp being adapted to allow movement along and about the longitudinal axis of the at least one mounting structure and being fastenable thereto using a lever movement, and
the support system being adapted to prevent movement of the television relative to the at least one mounting structure when the at least one universal clamp is fastened thereto.

According to one possible embodiment, the hole-pattern includes a first hole at the center of the mounting plate and a second hole positioned at 1-5/16" or 33.3 mm from the first hole.

According to another possible embodiment, the support system further comprises a fastening element insertable into the at least one universal clamp and fastenable to the mounting bracket.

According to yet another embodiment, the fastening element comprises a spigot and the universal clamp comprises a locking mechanism adapted to lock the spigot in position.

According to an embodiment, the mounting plate of the mounting bracket is fastened to the universal clamp by aligning the second hole of the hole-pattern with the spigot and fastening the mounting plate thereto using a butterfly screw, the mounting plate is further fastened to the at least one universal clamp with a ¼" screw inserted into the first hole of the hole pattern.

According to another embodiment, the position of the at least one universal clamp is adjustable along the length of the mounting structure, and said mounting structure having a diameter of up to 2.1".

According to a possible embodiment, when the mounting bracket is fastened to the at least one universal clamp, the movement of said mounting bracket relative to the mounting structure is blocked when said universal clamp is fastened thereto.

According to a possible embodiment, the mounting structure is adapted to be wedged between two fixed surfaces.

According to still another embodiment, the mounting structure is a tension pole.

According to another possible embodiment, the mounting structure includes two poles and the at least one universal clamp includes two clamps fastenable to a corresponding one of the two poles, the mounting plate having two opposed ends each provided with a respective end hole-pattern for respectively mounting to a corresponding one of the two universal clamps.

According to yet another possible embodiment, the end hole-patterns include a first end hole and a second end hole positioned at a distance of 1-5/16" or 33.3 mm from one another.

The invention resolves the deficiencies of the prior solutions in a system that provides a mounting solution for the following:
Apartment or condominium dwellers not permitted by landlords to drill television mounts into walls.
Apartment or condominium dwellers who do not have the available floor space for large TV consoles.
Apartment or condominium dwellers who have limited wall space due to sought-after open concept designs as well as prevalent use of large windows which often extend the entire length of a space.
The consumer who lacks the skill required to wall mount a television both safely and efficiently.
The television mounting system incorporates the following:
An aluminum pole that is extended between floor and ceiling, secured with a simple push of a lever similar to a tension rod. The pole is adaptable in length and can be secured between two fixed surfaces (floor and ceiling) and provides the support structure for the television mount.

Unlike other pole mounting solutions that have appeared recently in the market that require cutting a pole to size and drilling into the floor and ceiling, this option requires no tools.

The new television mounting system consists of a mount plate that has six spaced holes for the purpose of fastening the mount plate to a universal clamp. The mount-clamp is then secured to the pole of any height desired by the simple rotation of a lever. The mounting arms are then affixed at the back of the television and are easily mounted and locked into position onto the mount-clamp. (The mount-clamp can also be affixed to any existing pole that has been drilled into the floor and ceiling and has a maximum tubular circumference of 2.1 inches).

The new mounting bracket allows for LCD and LED televisions between 32" and 65" or up to 20 kg. (Other mount plates are available for smaller or larger televisions).

The invention described has the following advantages for the consumer:
Extreme ease in which it can be assembled
A non-permanent solution for mounting a television
No drilling into walls, ceiling or floor; eliminating any possibility of damaging living space
Space-saving

BRIEF DESCRIPTIONS OF DRAWINGS

The following are the drawings that will be described as the invention:

FIG. 1A Shows the tension pole that is used as the backbone of the television mount. FIG. 1B shows how to release the handle and adjust the height and FIG. 1C shows how to lock the and secure the pole into place.

FIG. 2 Shows the clamp that the television mounting bracket is to be fastened to, and the ¼" screw, spigot and butterfly screw that are used to affix the mount to the clamp. The affixed will be referred to as the mount-clamp.

FIG. 3 Shows the new mounting bracket with its' specifically designed hole pattern along the center of the mounting plate. These holes are spaced 33.3 mm apart at the center of the mount (for one pole mounting) and at both ends (for 2 pole mounting). All other features are purely design. The mounting bracket consists of a mounting plate and bracket arms that are attached to the back of the television and then mounted onto the plate. The bracket arms are not shown in FIG. 3.

FIG. 4 Shows the mount plate and how it is attached to the tension pole (or any existing pole up to up to 2.1" in diameter). The simplicity of the system is shown here.

FIG. 5A shows the mounting plate and bracket arms that are attached to the clamp. The various screws necessary for attaching the bracket arms to the back of the television are shown here. FIG. 5B shows how to attach the bracket arms to the back of the television with a flat or curved back. FIG. 5C shows that once attached the bracket arms are then locked into position onto the mounting plate that has been secured onto the pole by the clamp.

DESCRIPTION OF DRAWINGS

The accompanying drawings illustrate the embodiments of the invention and serve to explain the principles of the invention. The following is the description of the system required for carrying out the present invention.
Tension Pole.

Once attached the mount-clamp can now be positioned onto the pole at any height by simply rotating the knob 5 clockwise and fastening into place.

Figure 1A:
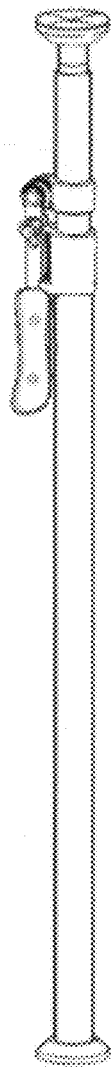
FIG. 1A depicts the pole used in the system. The pole can consist of any pole up to 2.1" in diameter but in this case a tension mounted pole that requires no tools to install is used. The pole is made from both aluminum and cast aluminum. It consists of a 45 mm tube (lower) and a 40 mm tube (upper), that extends between two fixed surfaces (floor and ceiling) and is rapidly secured by a clamp mechanism which exerts pressure to the upper pole when mounting. The pole extends between 6 ft 11 inches to 12 ft 5 inches.
Figure 1B:
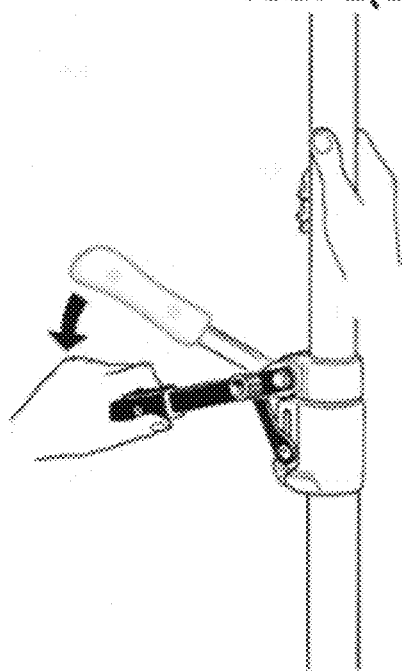
FIG. 1B shows the method to release the handle and adjust the height required from floor to ceiling.
Figure 1C:
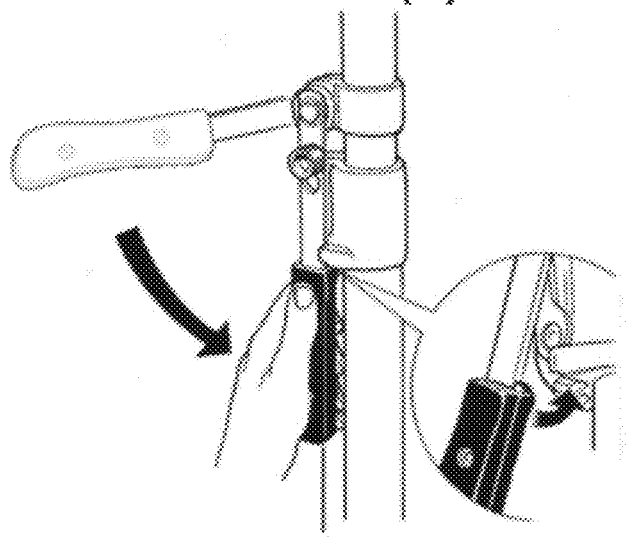
FIG. 1C shows the locking method used to secure the pole into place and prevent accidental opening of the lever.
New Mount and Clamp.
Figure 2:
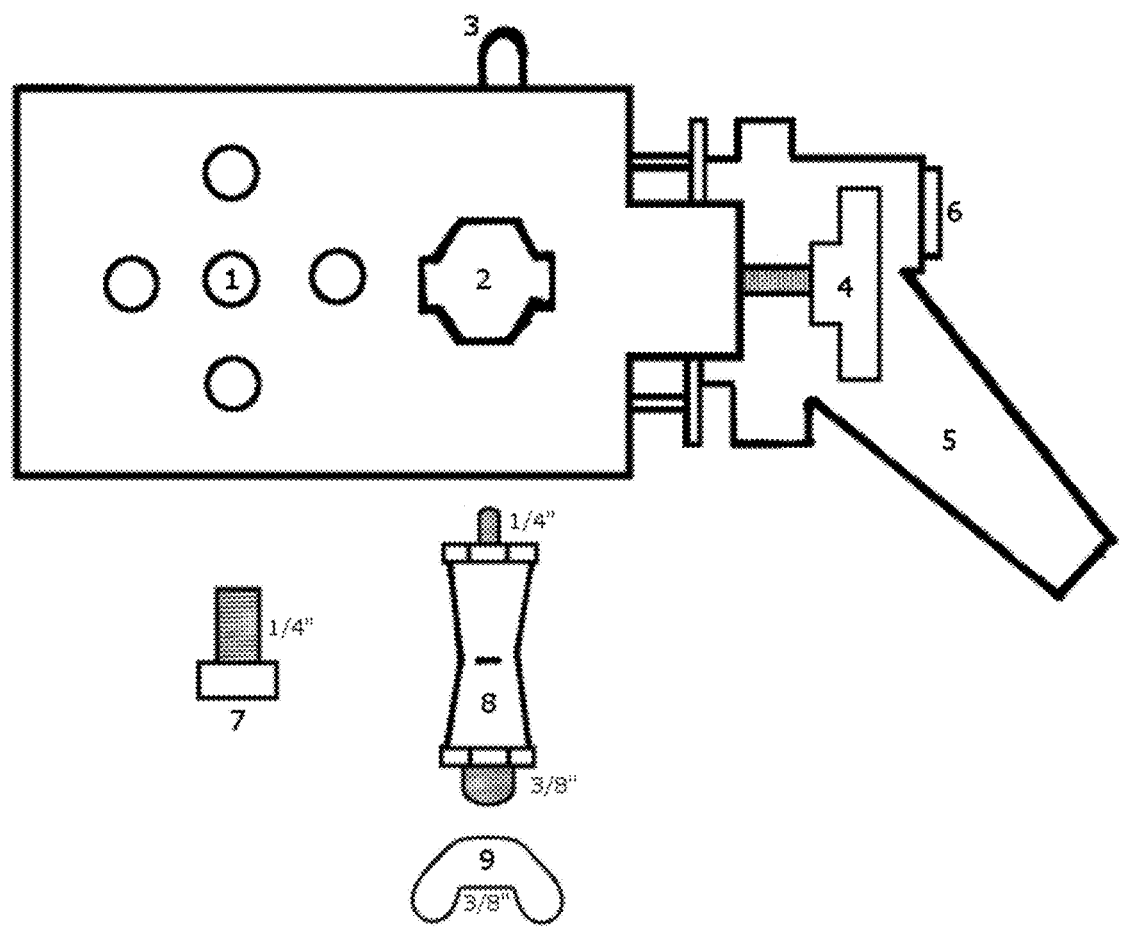
FIG. 2 shows the universal clamp that the new mounting bracket will be affixed upon. A spigot 8 is inserted into the opening 2 by pressing down on the lock mechanism 3 and inserting the spigot with a ⅜" thread facing outwards. The lock mechanism 3 is then released locking the spigot into place, the spigot is then secured into place by rotating the knob 4 clockwise. A quick release button 6 can be used when tightening or loosening the clamp onto a pole.
Figure 3:
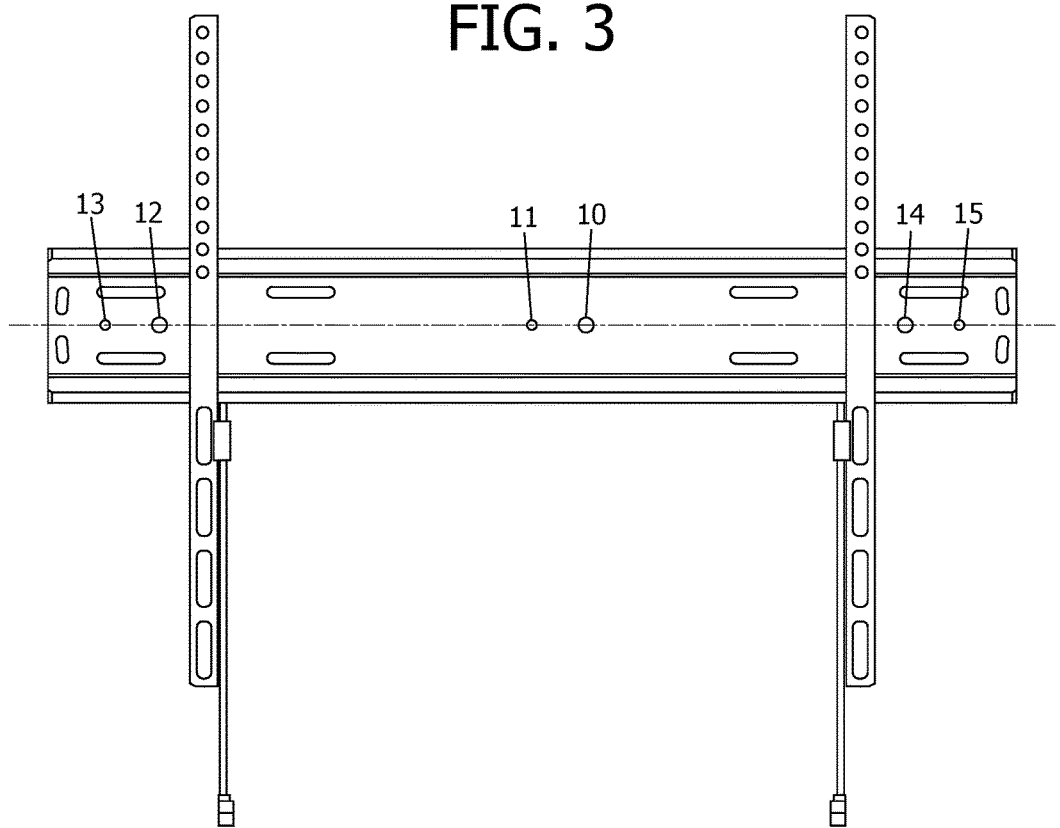
FIG. 3 shows the new television mounting bracket that has six unique holes specifically designed for mounting onto the clamp (bracket arms are not shown). At the center of the mounting plate we have a ¼" hole 11 and at a distance of 33.3 mm from the center we have a ⅜" hole 10. The same hole pattern is found to the left of the mount 13 and 12 and the reverse is found to the right 15 and 14. This is for a two pole mounting option not shown.
Figure 4:
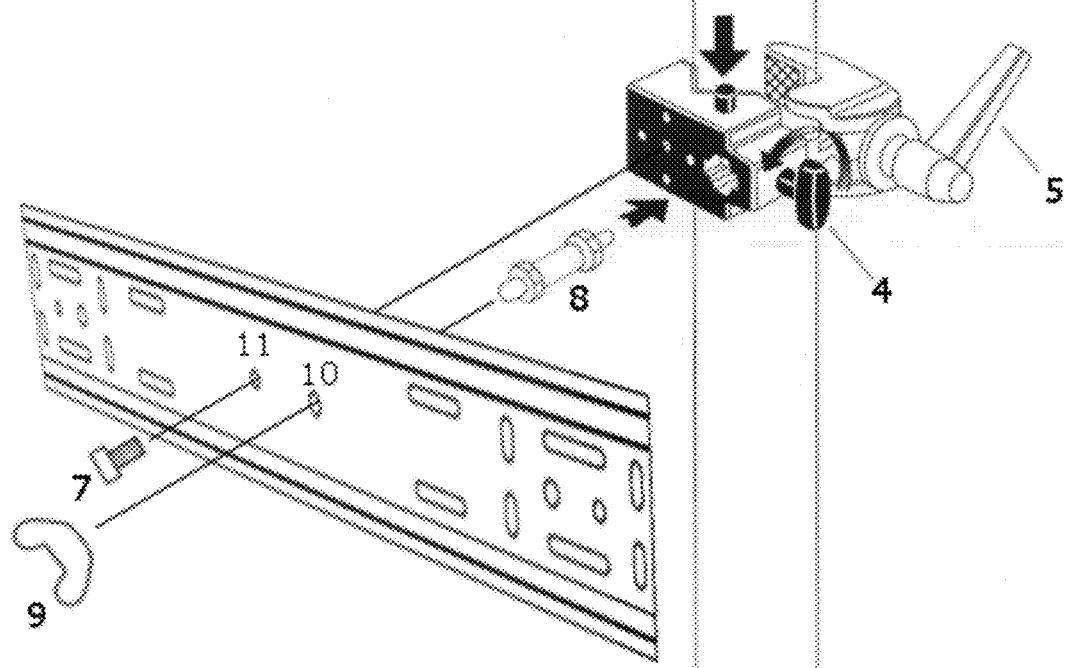
FIG. 4 shows the television mount plate is attached to the clamp by placing the ⅜" hole 10 over the spigot 8 and securing it into place with the ⅜" butterfly screw 9. A ¼" screw 7 is then inserted into the center hole 11 of the mount and then tightened. The mount is now secured into place. (If over 20 kg, a two pole attachment is recommended utilizing the same method; using holes 12 and 13 as well as holes 14 and 15 as seen in FIG. 3).
Figure 5A:
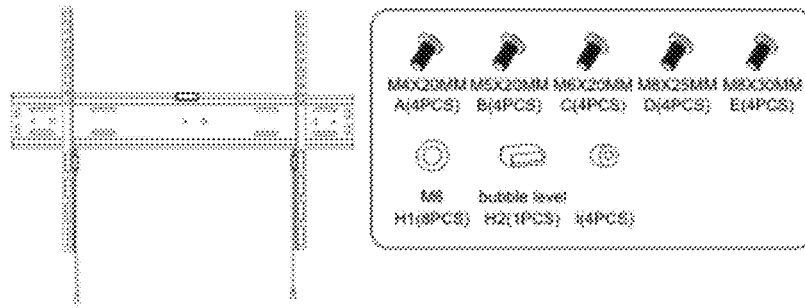
Figure 5B:
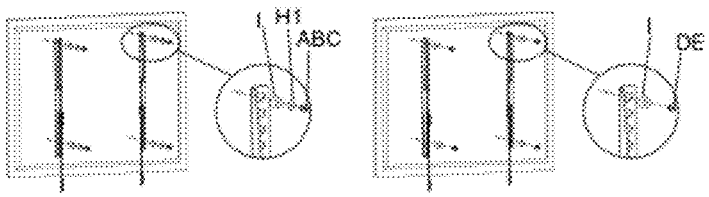
Figure 5B:
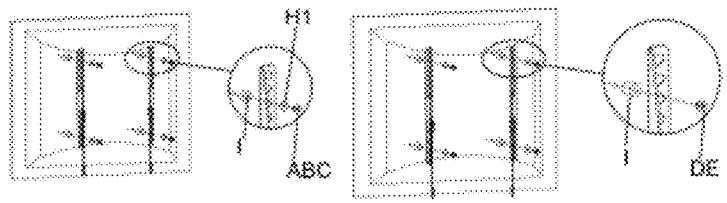
Figure 5C:
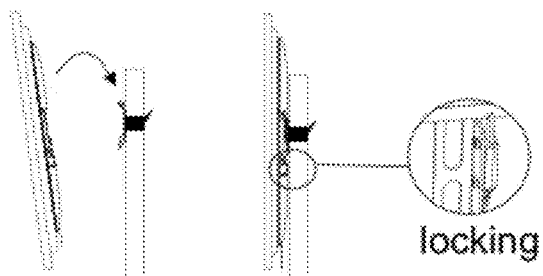

FIG. 5A shows the mounting bracket and the screws that are used to attach the bracket arms to the back of the television. This attachment procedure is standard in the industry as seen in FIG. 5B Once the bracket arms have been attached to the back of the television it is now ready for mounting onto the plate and is secured into place with a locking feature as shown in FIG. 5C.

The VESA standard requires that all LCD and LED panel televisions have at least four hard points and threaded holes positioned at the corners of a rectangular shape. The mount and bracket arms have holes and screws to accommodate such televisions, as seen in FIG. 5A and 5B.

I claim:
1. A support system for supporting a television, said support system comprising:
(a) a mounting bracket for securing the television thereon, and
(b) at least one universal clamp;
the mounting bracket being fixedly mountable to said at least one universal clamp and comprising;
a mounting plate provided with a hole-pattern spaced for mounting to the at least one universal clamp; and
bracket arms adapted to be attachable to a back of the television; and
(c) at least one mounting structure defining a longitudinal axis, having a length adjustable along said longitudinal axis and being adapted to be tension mounted;
the at least one universal clamp being adapted to allow movement along and about the longitudinal axis of the at least one mounting structure and being fastenable thereto using a lever movement, and
the support system being adapted to prevent movement of the television relative to the at least one mounting structure when the at least one universal clamp is fastened thereto.

2. The support system according to claim 1, wherein the hole-pattern includes a first hole at the center of the mounting plate and a second hole positioned at 1-5/16" or 33.3 mm from the first hole.

3. The support system according to claim 2, wherein the fastening element comprises a spigot and the universal clamp comprises a locking mechanism adapted to lock the spigot in position.

4. The support system according to claim 3, wherein the mounting plate of the mounting bracket is fastened to the at least one universal clamp by aligning the second hole of the hole-pattern with the spigot and fastening the mounting plate thereto using a butterfly screw, the mounting plate is further fastened to the at least one universal clamp with a ¼" screw inserted into the first hole of the hole-pattern.

5. The support system according to claim 1, further comprising a fastening element insertable into the at least one universal clamp and fastenable to the mounting bracket.

6. The support system according to claim 1, wherein the position of the at least one universal clamp is adjustable along the length of the mounting structure, said mounting structure having a diameter of up to 2.1 ".

7. The support system according to claim 1, wherein when the mounting bracket is fastened to the at least one universal clamp, the movement of said mounting bracket relative to the mounting structure is blocked when said universal clamp is fastened thereto.

8. The support system according to claim 1, wherein the mounting structure is adapted to be wedged between two fixed surfaces.

9. The support system according to claim 1, wherein the mounting structure is a tension pole.

10. The support system according to claim 1, wherein the mounting structure includes two poles and the at least one universal clamp includes two clamps fastenable to a corresponding one of the two poles, the mounting plate having two opposed ends each provided with a respective end hole-pattern for respectively mounting to a corresponding one of the two universal clamps.

11. The support system according to claim 10, wherein the end hole-patterns include a first end hole and a second end hole positioned at a distance of 1-5/16" or 33.3 mm from one another.

\* \* \* \* \*